April 27, 1943. O. W. WINTER 2,317,962
WELDING MACHINE ELECTRODE
Filed Dec. 3, 1941 3 Sheets-Sheet 1

INVENTOR
Otto W. Winter,
BY
Beau, Brooks, Buckley & Beau.
ATTORNEYS

April 27, 1943.　　　O. W. WINTER　　　2,317,962
WELDING MACHINE ELECTRODE
Filed Dec. 3, 1941　　　3 Sheets-Sheet 2
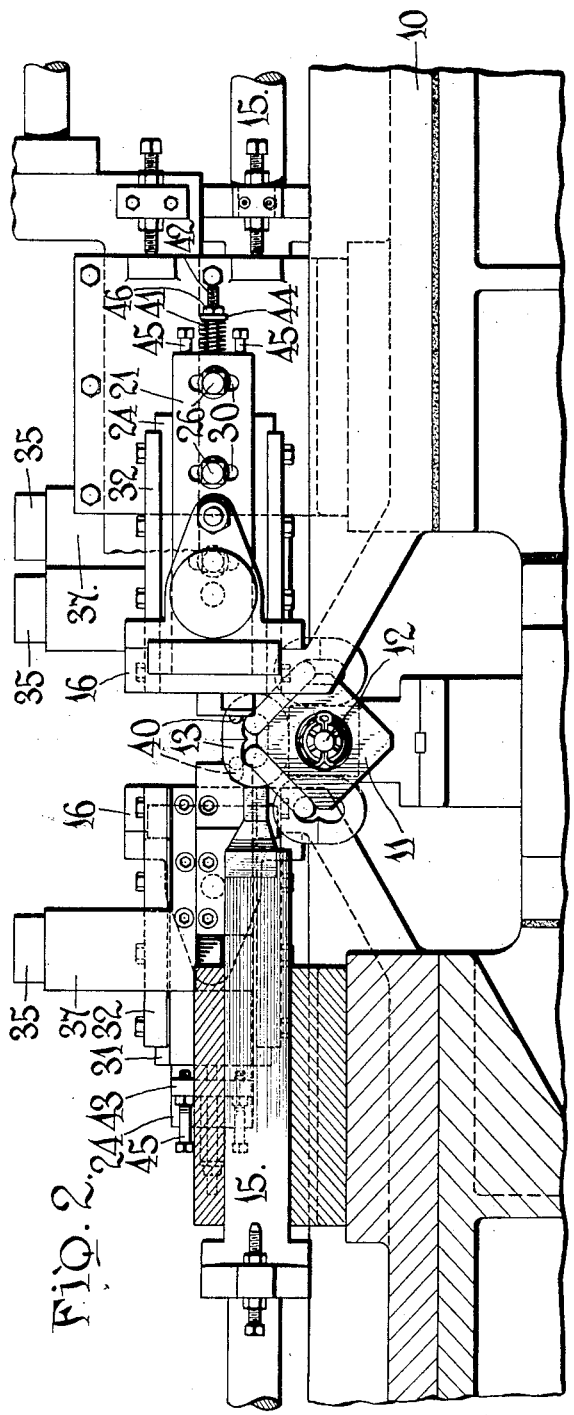
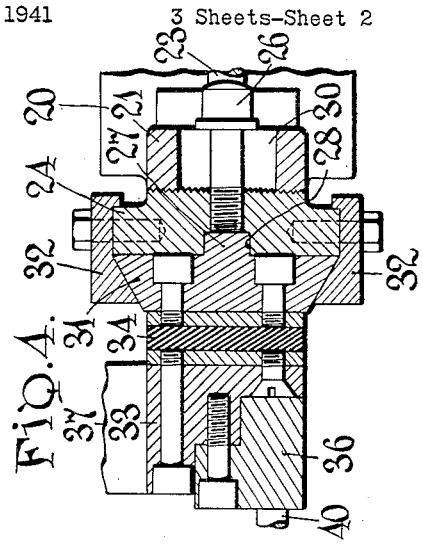
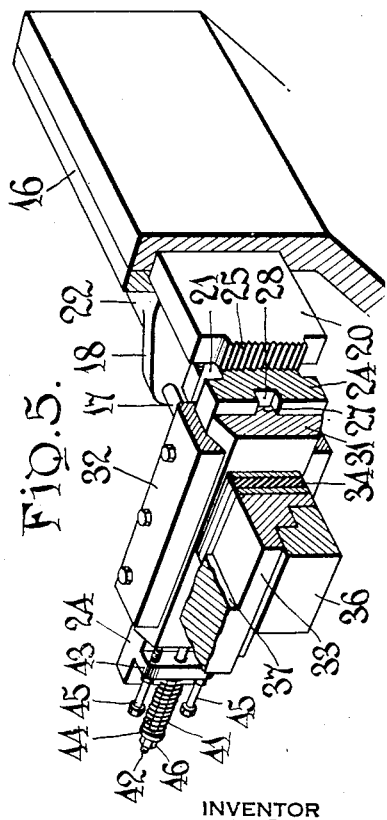
INVENTOR
Otto W. Winter,
BY
Beau, Brooks, Buckley & Beau.
ATTORNEYS

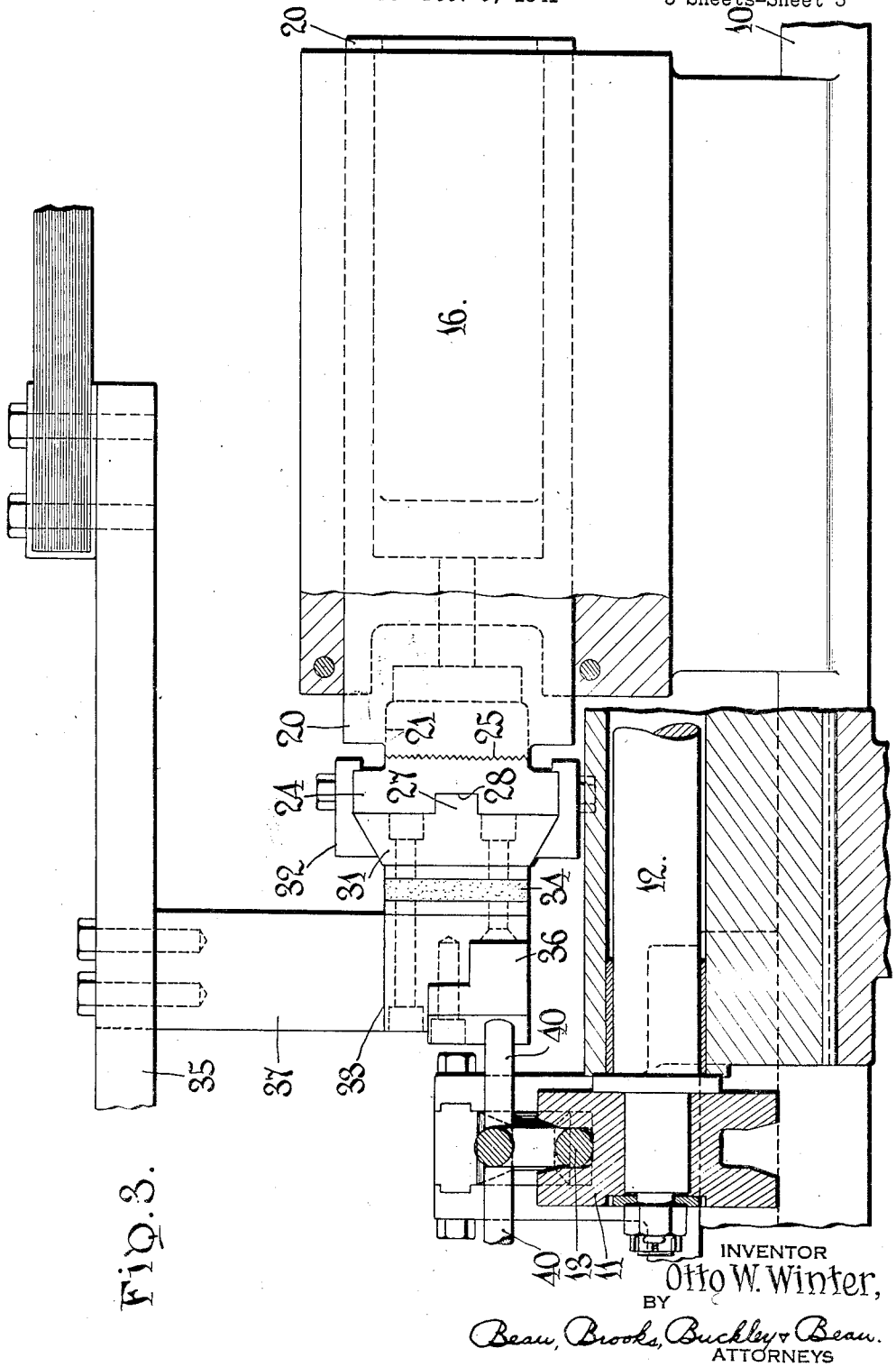

Patented Apr. 27, 1943

2,317,962

UNITED STATES PATENT OFFICE 2,317,962

WELDING MACHINE ELECTRODE

Otto W. Winter, Grand Island, N. Y., assignor to Columbus McKinnon Chain Corporation, Tonawanda, N. Y., a corporation of New York Application December 3, 1941, Serial No. 421,479

14 Claims. (Cl. 219—5)

My invention relates in general to chain welding machines and more particularly to the electrodes thereof with special reference to the mounting and actuation of such electrodes.

The principal object of my invention has been to provide electrodes so mounted and actuated that the pressure produced by all of the electrodes upon the link being welded is equalized and maintained throughout the period of welding.

Another object has been to provide electrodes mounted upon sliding ways so that when the ends of the link or other workpiece with which the electrodes are contacting are closed up in the act of welding, the electrodes will be moved along with the workpiece due to frictional contact therewith.

Moreover, the electrode holders may be fastened to the sliding ways by means of neoprene, rubber or other flexible and preferably insulating material so as to add to the flexibility of the mounting.

Furthermore, my electrodes may be actuated by means of fluid operated pistons so as to bring about a uniform and flexible pressure upon the workpiece.

The above objects and advantages have been accomplished by the device shown in the accompanying drawings, of which:

Fig. 2 is a fragmentary, front elevation of the device with one portion thereof shown in section along the major axis of a link being welded.

Fig. 3 is an enlarged, fragmentary, sectional view taken on line III—III of Fig. 1.

Fig. 4 is an enlarged, fragmentary, sectional view taken on line IV—IV of Fig. 1; and Fig. 5 is a fragmentary, perspective view showing the mounting for one of the electrodes, portions of the various parts being broken away for clearness of illustration.

Figure 1:
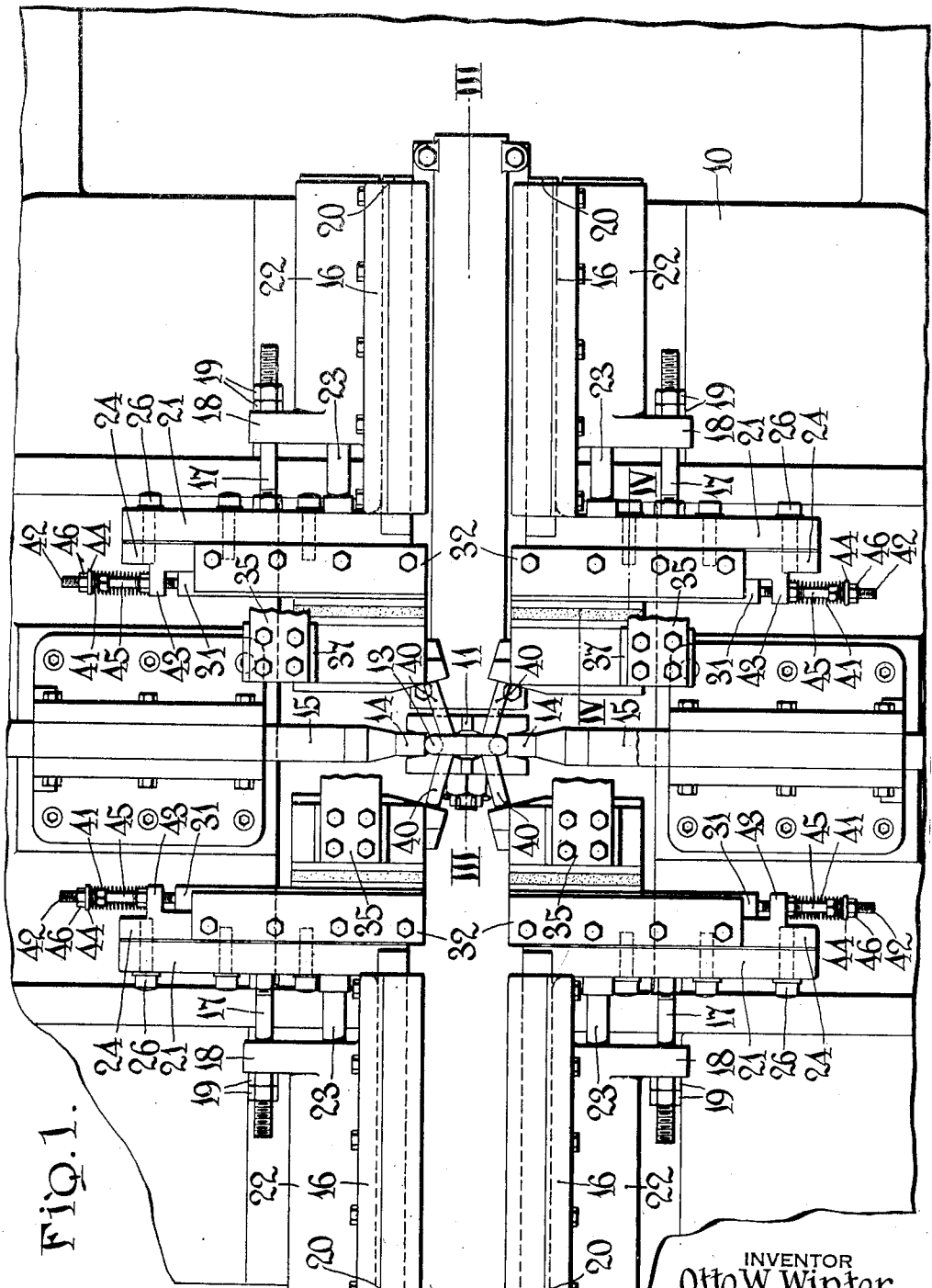
Fig. 1 is a fragmentary, plan view of a chain welding machine showing my invention applied thereto.

In the drawings, 10 represents the frame of the machine which carries not only the electrodes of my invention but all the other parts of the welding machine which are the subject matters of separate applications and therefore will not be described herein in detail.

This machine is of the type in which each alternate link of the chain is fed in upright position ready for welding by means of a chain sprocket 11 by which it is held in such position until the welding operation is completed. The position of the link and of the sprocket is clearly shown in Fig. 2. This chain sprocket is carried by a shaft 12 which is suitably mounted for intermittent rotation by mechanism which does not form a part of this invention and is, therefore, not shown or described in detail. The link shown in position is indicated by the numeral 13.

My machine is provided with suitably actuated upset tools 14 which are arranged substantially coincident with the major axis of the link 13 and which bear against the ends thereof serving to squeeze the ends of the link together when heated by the electrodes and when completing the weld. These tools are carried by slidably mounted upset bars 15 which are actuated by means which do not form a part of this invention and therefore are not further shown and described.

A clamp slide bracket 16 is provided for each of the electrodes of the machine. One of these brackets is arranged on each side of each of the upset tools and is suitably secured to the frame 10 of the machine. Mounted within each of these brackets for reciprocation toward and away from the side of the link is an electrode clamp slide 20. Carried by each of these slides is an electrode clamp arm 21. Each arm is arranged at substantially right angles to the clamp slide and extends outwardly away from the central plane of the machine.

Carried by each of the clamp slide brackets 16 is an electrode clamp cylinder 22 which has its piston rod 23 suitably connected to the clamp arm 21 whereby the arm with its slide will be reciprocated back and forth within the slide bracket 16. The cylinder is, of course, supplied with fluid under pressure from a suitable source not shown and controlled by means of suitable solenoid-operated valves which are articles of standard manufacture and therefore are not shown or described in this application. A stop stud 17 is carried by the arm 21 and its outer end passes through a stop lug 18 where it is screwthreaded for the reception of adjusting nuts 19, whereby the inward movement of the slide 20 may be limited.

Attached to the outer surface of the electrode clamp arm 21 is an electrode slide holder 24. The adjacent and coacting surfaces of the arm and holder are provided with serrations 25 whereby the holder may be adjusted vertically to accommodate various sized links. The holder is held in position upon the arm by means of bolts 26 which pass through slots 30 formed in the arm and which are screwthreaded into the electrode slide holder.

An electrode slide 31 is mounted upon the outer face of the slide holder 24 and is preferably attached thereto in slidable manner by means of gibs 32, one arranged on each side of the slide. As shown in the drawings, the bearing surfaces between the gibs and the edge surfaces of the slide are dovetailed. A rib 27 may be formed on the slide 31 for engagement with a co-acting groove 28 formed in the slide holder 24 for further guidance of the slide. A die holder 33 is provided for each of the electrode holders and each is suitably attached to the electrode slide through the medium of an insulating strip 34 which is secured to the die holder and to the slide by suitable means. This strip insulates the mechanism of the machine from the die holder to which electrical connection is made by means of the conductors 35. These strips may, if desired, be of flexible material such as neoprene, rubber or other suitable material, whereby the electrode is so flexibly mounted as to produce proper electrical contact with the workpiece. Each die holder has suitably attached thereto an electrode die 36 which carries the electrode 40. The conductors 35 are preferably attached to upstanding lugs 37 formed on the die holder 33.

The electrode slide 31 is held in its normal inactive position by means of a retracting spring 41. This spring is mounted about a stud 42 which is screwthreaded into the slide 31. Each electrode slide holder 24 is provided at its outer end with an inwardly extending flange 43 through which the stud 42 passes. The spring 41 is arranged between the outer surface of this flange and a washer 44 arranged on the stud and held in adjustable position by means of a nut 46. When the slide moves inwardly with the end of the link as the joint thereof is being closed up in the act of welding, the electrode slide will be moved along with the link through the frictional contact of the electrode therewith, and the spring 41 will be compressed. When the electrodes are moved from out of contact with the link, the springs will serve to retract the slides to their normal inoperative positions.

Suitable screws 45 are also carried by the flange 43 and serve by contact with the slide to limit the outward movement when retracted and moved to normal inoperative position by means of the spring.

In the operation of the device the electrode clamp cylinder 22 is actuated by means of the fluid under pressure, through the instrumentality of suitable valve means not shown, which causes the clamp slide 20 to be moved outwardly, carrying with it the electrode 40 and all the associated parts, thus bringing the electrode in contact with the side of the link. Obviously, all four cylinders are actuated simultaneously so that the electrodes from opposite sides will contact the link at substantially the same instant. The amount of pressure of the electrode upon the link is dependent upon the pressure of the fluid supplied to the cylinder. As the electrodes are now held in firm contact with the link, current is supplied to each electrode through the conductors 35 and from a suitable transformer not shown or described. When once engaged with the link, the electrodes because of their slidable mounting are moved along therewith as the ends of the link are being closed up by the upset tools 14. When neoprene or other suitable flexible material is used to mount the electrode die 33, the electrodes will adjust themselves to the workpiece so as to produce substantially perfect electrical contact therewith.

Obviously, some modifications of the details herein shown and described may be made without departing from the spirit of my invention or the scope of the appended claims, and I do not, therefore, wish to be limited to the exact details herein shown and described.

What is claimed is:

1. In a chain link welding machine, the combination with link turning means and link upset tools, of electrode mountings arranged one at each side of the ends of the link, each comprising an electrode, sliding means for moving said electrode into electric contact with the link, and connecting means interposed between the electrode and said sliding means and having at least two relatively movable parts, one part carrying said electrode and being capable of relative movement with the other part at substantially right angles to the movement of said sliding means.

2. In a chain link welding machine, the combination with link turning means and link upset tools, of electrode mountings arranged one at each side of the ends of the link, each comprising an electrode clamp slide, hydraulic means for moving said clamp slide toward the link, an electrode slide carried by said clamp slide and arranged for movement at substantially right angles to the movement of said clamp slide, and an electrode carried by said electrode slide for engagement with the link.

3. In a chain link welding machine, the combination with link turning means and link upset tools, of electrode mountings arranged one at each side of the ends of the link, each comprising an electrode clamp slide, hydraulic means for moving said clamp slide toward the link, an electrode slide carried by said clamp slide and arranged for movement at substantially right angles to the movement of said clamp slide, and vertically adjusting means for said electrode slide.

4. In a chain link welding machine, the combination with link turning means and link upset tools, of electrode mountings arranged one at each side of the ends of the link, each comprising an electrode clamp slide, hydraulic means for moving said clamp slide toward the link, an electrode slide carried by said clamp slide and arranged for movement at substantially right angles to the movement of said clamp slide, and means carried by said clamp slide and said electrode slide for resiliently holding said electrode slide in its normal inoperative position.

5. In a chain link welding machine, the combination with link turning means and link upset tools, of electrode mountings arranged one at each side of the ends of the link, each comprising an electrode clamp slide, hydraulic means for moving said clamp slide toward the link, an electrode slide carried by said clamp slide and arranged for movement at substantially right angles to the movement of said clamp slide, means carried by said clamp slide and said electrode slide for resiliently holding said electrode slide in its normal inoperative position, and stop means for limiting the retractive movement of said slide.

6. In a chain link welding machine, the combination with link turning means and link upset tools, of electrode mountings arranged one at each side of the ends of the link, each comprising an electrode clamp slide, hydraulic means for moving said clamp slide toward the link, stop means associated with said hydraulic means to limit the outward movement of said clamp slide, an electrode slide carried by said clamp slide and arranged for movement at substantially right angles to the movement of said clamp slide, and an electrode carried by said electrode slide for engagement with said link.

7. An electrode mounting for chain welding machines, comprising an electrode clamp slide movably carried by said machine, means carried by said clamp slide and arranged for movement therewith and in a direction at substantially right angles thereto, an electrode carried by said means, and means for actuating said clamp slide.

8. An electrode mounting for chain welding machines, comprising an electrode clamp slide movably carried by said machine, means for actuating said clamp slide, an electrode slide arranged at substantially right angles to said clamp slide and slidably carried thereby for movement therewith and at substantially right angles thereto, and an electrode carried by said electrode slide.

9. An electrode mounting for chain welding machines, comprising an electrode clamp slide movably carried by said machine, means for actuating said clamp slide, a clamp arm carried by said clamp slide and arranged at substantially right angles thereto, an electrode slide slidably supported by said arm, and an electrode carried by said electrode slide.

10. An electrode mounting for chain welding machines, comprising an electrode clamp slide movably carried by said machine, means for actuating said clamp slide, a clamp arm carried by said clamp slide and arranged at substantially right angles thereto, an electrode slide holder carried by said arm, an electrode slide slidably carried by said holder, and an electrode carried by said electrode slide.

11. An electrode mounting for chain welding machines, comprising an electrode clamp slide movably carried by said machine, means for actuating said clamp slide, a clamp arm carried by said clamp slide and arranged at substantially right angles thereto, an electrode slide holder carried by said arm, means for vertically adjusting said slide holder, an electrode slide slidably carried by said holder, and an electrode carried by said electrode slide.

12. An electrode mounting for chain welding machines, comprising an electrode clamp slide movably carried by said machine, means for actuating said clamp slide, a clamp arm carried by said clamp slide and arranged at substantially right angles thereto, an electrode slide slidably supported by said arm, spring means carried by said arm and said slide for maintaining said slide in its normally inactive position, and an electrode carried by said electrode slide.

13. An electrode mounting for chain welding machines, comprising an electrode clamp slide movably carried by said machine, means for actuating said clamp slide, a clamp arm carried by said clamp slide and arranged at substantially right angles thereto, an electrode slide holder carried by said arm, means for vertically adjusting said slide holder, an electrode slide slidably supported by said holder, spring means carried by said slide and holder for maintaining said slide in its normally inactive position, and an electrode carried by said electrode slide.

14. An electrode mounting for chain welding machines, comprising an electrode clamp slide movably carried by said machine, hydraulic means for actuating said clamp slide, an electrode slide arranged at substantially right angles to said clamp slide and slidably carried thereby for movement therewith and at substantially right angles thereto, and an electrode carried by said electrode slide.

OTTO W. WINTER.